(12) United States Patent
Brazell

(10) Patent No.: US 6,899,423 B1
(45) Date of Patent: May 31, 2005

(54) HOLDING APPARATUS FOR EYE GLASSES

(76) Inventor: Ronald L. Brazell, 7924 Maehs La., Oklahoma City, OK (US) 73162

( * ) Notice: Subject to any disclaimer, the term of this patent is extended or adjusted under 35 U.S.C. 154(b) by 0 days.

(21) Appl. No.: 10/784,584

(22) Filed: Feb. 24, 2004

(51) Int. Cl.7 .................................................. G02C 3/00
(52) U.S. Cl. ....................................... 351/157; 351/156
(58) Field of Search .......................... 351/123, 156–158; 2/452

(56) References Cited

U.S. PATENT DOCUMENTS 4,479,703 A * 10/1984 Enghofer .................... 351/123
5,087,118 A * 2/1992 Gill ............................ 351/156

* cited by examiner

Primary Examiner—Huy Mai
(74) Attorney, Agent, or Firm—Frank L. Hart

(57) ABSTRACT

A holding apparatus for eye glasses which have magnets connected to the left and right edges thereof. The holding apparatus has a flexible retaining member for positioning about a users neck. A holding member magnet is connected to each end of the retaining member via a pivotal element which is of sufficient flexibility for moving and orienting the polarity of the holding element magnets for attraction and connection to a respective eye glass magnet when placed in close proximity thereto.

6 Claims, 3 Drawing Sheets

HOLDING APPARATUS FOR EYE GLASSES

CROSS REFERENCE TO RELATED APPLICATIONS

Not applicable

STATEMENT REGARDING FEDERALLY SPONSORED RESEARCH OR DEVELOPMENT

Not applicable INCORPORATION-BY-REFERENCE OF MATERIAL SUBMITTED ON A COMPACT DISC Not applicable

BACKGROUND OF THE INVENTION

The subject invention relates to an improved holding apparatus for eye glasses.

More particularly the subject invention relates to improved holding apparatus which are releaseably connectable by magnetic force to eye glasses.

Description of Related Art including information disclosed under 37 CFR 1.97 and 1.98

Holding apparatus for glasses are well known in the art. Such holding apparatus are an elongated retaining member, such as a string, cord or chain that has a loop on each end that is connectable to the ear pieces of eye glasses. These holding apparatus are generally used by individuals who do not need eye glasses except for reading. In their use, the eye glasses, when not in use, are removed from the individuals nose and hang by the retaining member about the individuals neck with the eye glasses resting on their upper chest. At this position, they are protected against damage, loss, or misplacement.

Many of these holding apparatus for eye glasses are used with sun glasses which, when not in use, are likewise protected.

A recent invention that is proving to be most popular is the use of magnets to connect eye glasses to sun glasses. This invention is directed to replace clip on sun glasses that have no ear pieces and clip onto normally clear eye glasses when one goes outside and into the sun light.

In this recent invention, the normally clear eye glasses have left and right edges. A magnet is connected to the eye glasses at each of said edges. Accompanying sun glasses likewise have left and right edges and a magnet connected to the sun glasses at each of said edges and, at an orientation wherein at the magnets of the sun glasses are magnetically attracted to and connected to the respective magnets of the normally clear eye glasses, the lens of sun glass are immediately adjacent and generally parallel to the lens of the normally clear eye glasses.

In these newly developed normally clear eye glasses and associated sun glasses, the improved holding apparatus of this invention is magnetically connectable to the sun glass, the normally clear eye glasses, and the composite of the normally clear eye glasses with the sun glasses installed thereon. With the capabilities of this invention a user has several alternative methods of use.

SUMMARY OF THE INVENTION

In one aspect of the invention a holding apparatus for eye glasses has first and second pivotal elements and first and second holding apparatus magnets. The eye glasses have left and right edges and a magnet connected to the eye glasses at each of said edges. The holding apparatus has a retaining member having first and second end portions and is of a length sufficient for encompassing a users head. The first and second pivotal elements each have first and second ends. The first end of each pivotal element is connected to a respective end portion of the retaining member. The first and second holding apparatus magnets are each connected to a respective second end portion of the pivotal elements. The pivotal elements each are of a sufficient flexibility for moving and orienting the polarity of the holding element magnets for attraction and connection to a respective eye glasses magnet when placed in close proximity thereto.

BRIEF DESCRIPTION OF THE SEVERAL VIEWS OF THE DRAWING(S)

DETAILED DESCRIPTION OF THE INVENTION

Figure 1:
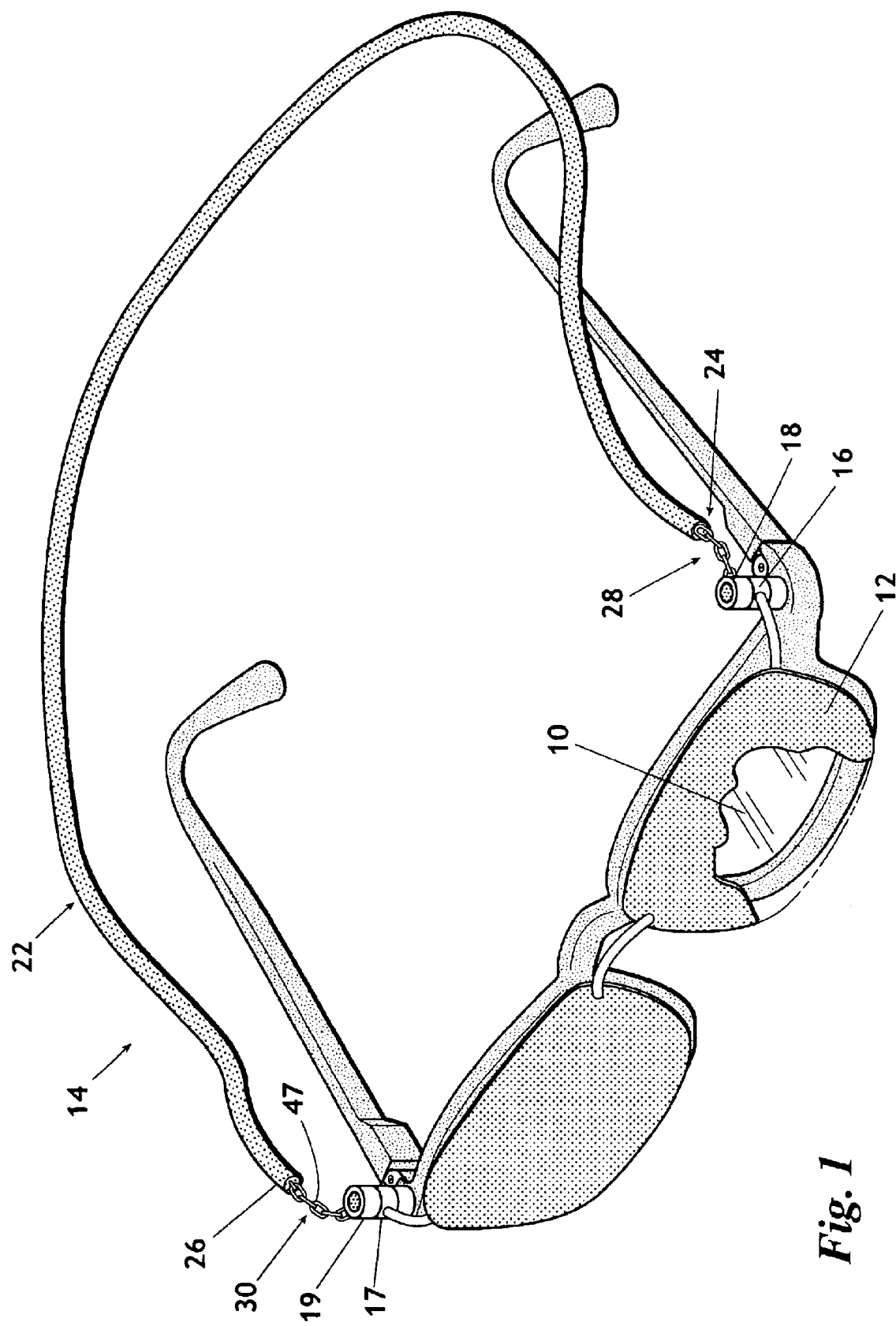
FIG. 1 is a perspective view of a pair of normally clear eye glasses and sun glasses, each having the modern magnet type connection of one to the other.

Referring to FIG. 1, some modem type generally clear eye glasses 10 and sun glasses 12 are maintained relative one to the other by magnetic attraction. The holding apparatus 14 of this invention is magnetically maintained to one of the glasses 10 or 12. Both of the glasses 10, 12 have left and right edges and a magnet 16, 17 and 18, 19 connected to the respective glasses 10, 12 at the edges thereof A retaining member 22 of this invention has first and second end portions 24, 26 and is of a length sufficient for encompassing a users head.

Figure 2:
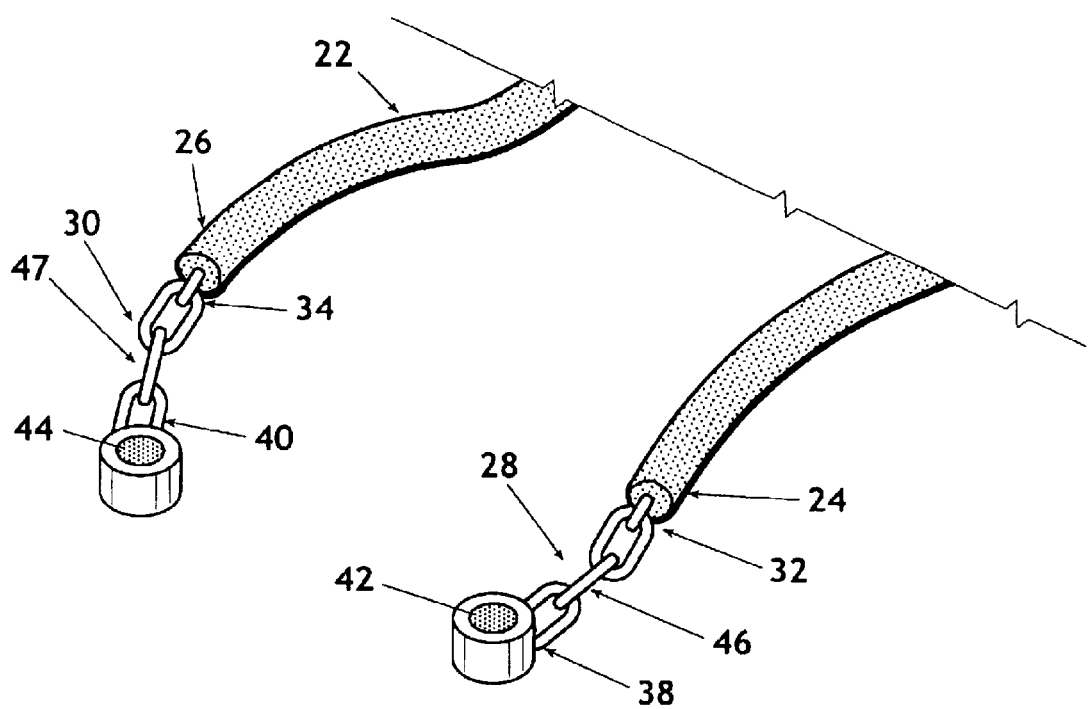
FIG. 2 is a perspective enlarged view of pivotal elements of this invention.

As better seen in FIG. 2, first and second pivotal elements 28, 30 each have first and second ends 32, 34 and 38, 40 respectfully. Said first ends 32, 38 are connected to a respective end portion 24, 26 of the retaining member 22.

First and second holding apparatus magnets 42, 44 are each connected to a respective second end portion 34, 40 of the pivotal elements 28, 30. Each of the pivotal elements 28, 30 are of sufficient flexibility for moving and orienting the polarity of the holding element magnets 42, 44 for attraction and connection to a respective clear eye glasses magnet 16, 17 or 18, 19 when placed in close proximity thereto.

As is known in the art, when two magnets are brought in close proximity one to the other, like poles of the magnets repel and unlike poles attract. Therefore, when the magnets 42, 44 of the holding apparatus 14, are brought into close proximity to the magnets 16, 17 or 18, 19 of respective eye glasses 10 or 12, the holding apparatus magnets 42, 44, often must pivot or move up to ninety (90) degrees relative to the adjacent magnet in order to be attracted thereto. The flexibility of the pivotal elements 28, 30 provide for such movement and orientation by the holding apparatus magnets 42, 44 so that the holding apparatus 14 will be magnetically connected to the respective glasses 10 or 12.

Figure 3:
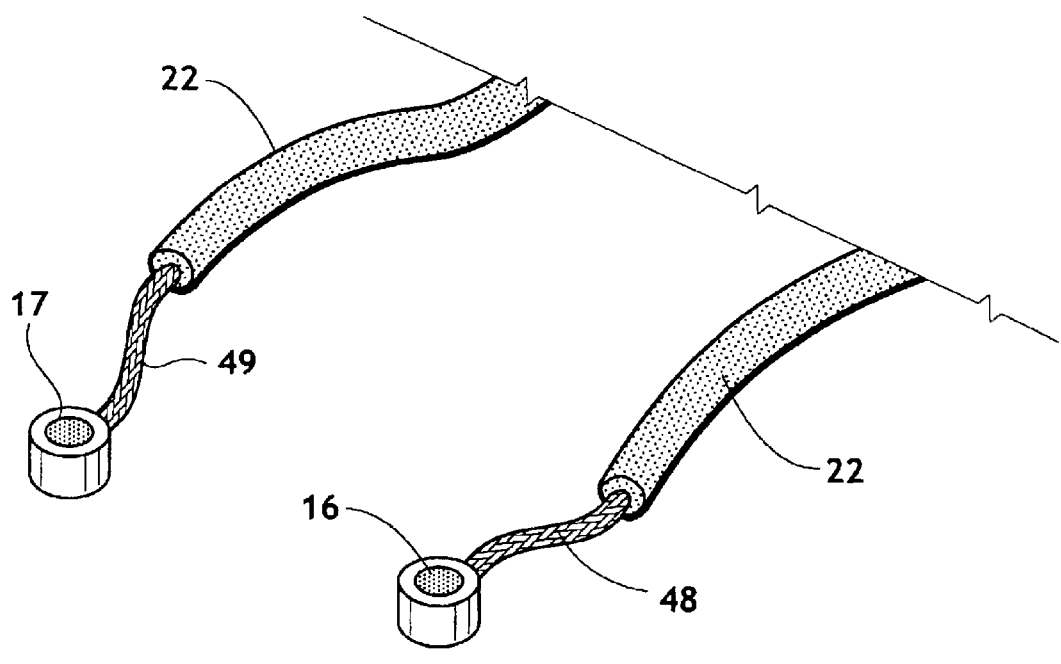
FIG. 3 is a perspective view of a portion of the improved holding apparatus of this invention with the pivotal elements being flexible cords.
Figure 4:
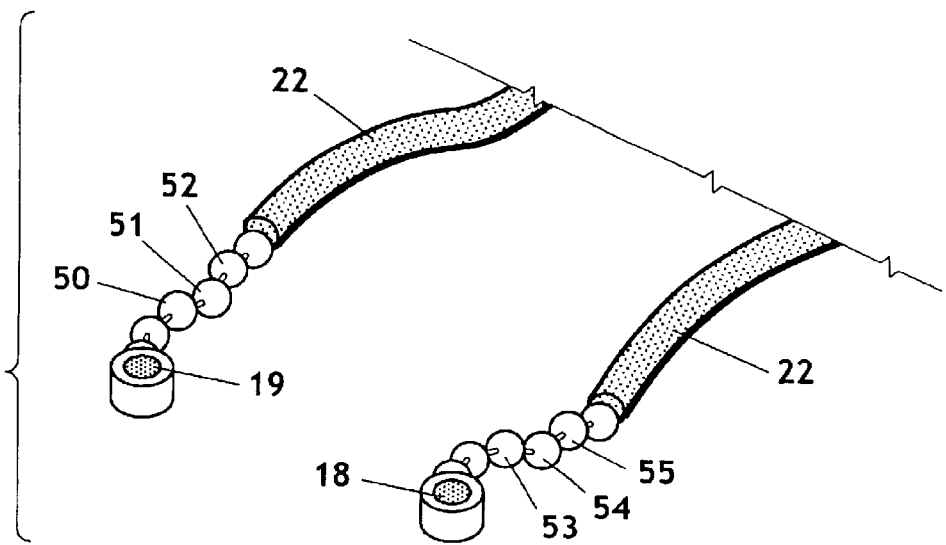
FIG. 4 is a perspective view of a portion of the improved holding apparatus of this invention with the pivotal elements being a plurality of flexible segments.
Figure 5:
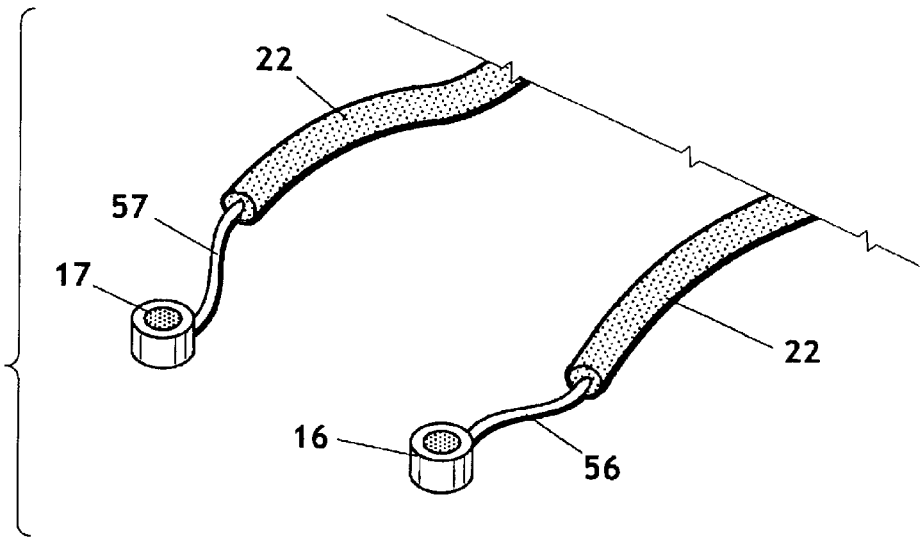
FIG. 5 is a perspective view of a portion of the improved holding apparatus of this invention with the pivotal elements being formed of organic plastic.
Figure 6:
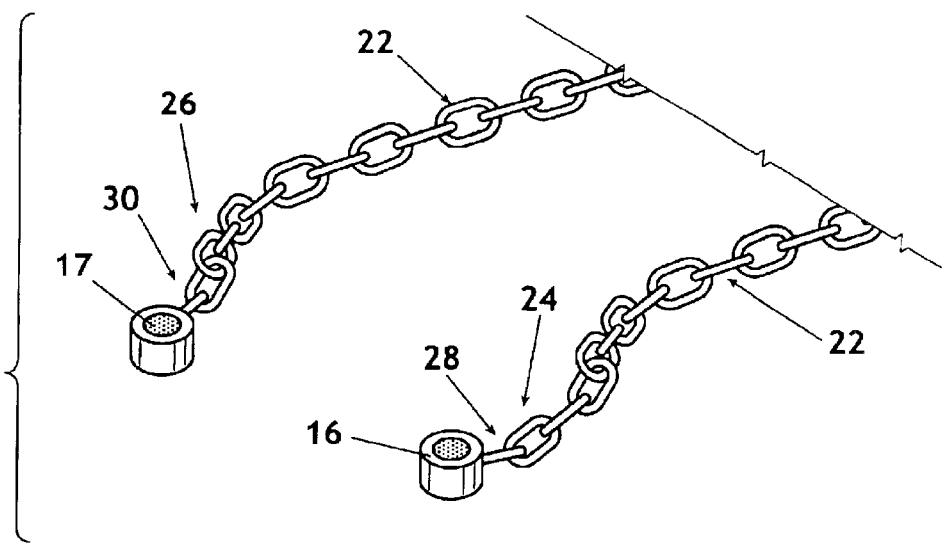
FIG. 6 is a perspective view of a portion of the improved holding apparatus of this invention with the retaining member formed of links of a chain and the pivotal elements form of the first and second end portion of the retaining member.

Sufficient flexibility of the pivotal elements 28, 30 can be provided by several different types of apparatus without departing from this invention. FIGS. 1 and 2 show the pivotal elements 28, 30 formed by links of a chain 46, 47. FIG. 3 shows the pivotal element formed by a cord 48, 49, such as a cotton cord for example. FIG. 4 shows the pivotal elements 28, 30 formed by a plurality of segments, for example beads 50–52 and 53–55, pivotally connected one to the other. FIG. 5 shows the pivotal elements 28, 30 formed of a strands of organic plastic 56, 57, for example polyethylene. FIG. 6 shows the retaining member 22 formed by links of a chain and the pivotal elements 28, 30 being formed of the first and second end portions 24, 26 of the retaining member 22.

Other types of pivotal members 28, 30 will become apparent to one skilled in the art after studying the subject invention and the specific type of pivotal members 28, 30 set forth above is without limitation. It should also be understood that the pivotal elements 28, 30 can be connected to their respective magnets and holding apparatus by any method desirable, such as for example clamping of a metal member, gluing, etc.

In the use of this invention, a user can magnetically connect the holding apparatus 14 to his generally clear reading glasses 10, so they can be removed and hung around the users neck when not in use. This is particularly beneficial to one who needs no lens correction when viewing objects at a distance.

In another use of this invention, the user can have his sunglasses 12 magnetically connected to his generally clear glasses 10 and the holding apparatus 14 magnetically connected to the sun glasses 12. Then when the user gets out of the sun or bright light, he can remove the sun glasses 12 from magnet connection to the generally clear glasses 10 and maintain the sun glasses 12 adjacent his or her chest by the holding apparatus 14.

In any use, magnetically connecting of the holding element 14 to the glasses 10 or 12 is greatly enhanced because the magnet poles of the holding element 14 will automatically align themselves with the respective magnets of the glasses to which they are desired to be connected.

Other aspects, objects, and advantages of this invention can become apparent by a study of the drawings, the disclosure and the appended claims.

What is claimed is:

1. In a holding apparatus for eye glasses which have left and right edges and a magnet connected to the eye glasses at each of said edges, said holding apparatus having a retaining member having first and second end portions and being of a length sufficient for encompassing a users head, the improvement comprising:

first and second elements each having first and second ends, said first end being connected to a respective end portion of the retaining member; and first and second holding apparatus magnets each being connected to a respective second end portion of the pivotal elements, said pivotal elements each being of sufficient flexibility for moving and orienting the polarity of the holding element magnets for attraction and connection to a respective eye glasses magnet when placed in close proximity thereto.

2. A holding apparatus for eye glasses, as set forth in claim 1, wherein the pivotal elements each include links of a chain.

3. A holding apparatus for eye glasses, as set forth in claim 1, wherein the pivotal elements each include a flexible cord.

4. A holding apparatus for eye glasses, as set forth in claim 1, wherein the pivotal elements each include a plurality of segments pivotally connected one to the other.

5. A holding apparatus for eye glasses, as set forth in claim 1, wherein the pivotal elements each are formed of organic plastic.

6. A holding apparatus for eye glasses, as set forth in claim 1, wherein the retaining member is formed of links of a chain and the pivotal elements are formed of the first and second end portions of the retaining member.

* * * * *